United States Patent [19]

Kurakake et al.

[11] Patent Number: 4,908,559
[45] Date of Patent: Mar. 13, 1990

[54] ROBOT CONTROL APPARATUS

[75] Inventors: Mitsuo Kurakake, Hino; Keiji Sakamoto; Takashi Iwamoto, both of Hachioji, all of Japan

[73] Assignee: Fanuc Ltd, Minamitsuru, Japan

[21] Appl. No.: 157,506

[22] PCT Filed: Jun. 30, 1987

[86] PCT No.: PCT/JP87/00450

§ 371 Date: Dec. 2, 1987

§ 102(e) Date: Dec. 2, 1987

[87] PCT Pub. No.: WO88/00369

PCT Pub. Date: Jan. 14, 1988

[30] Foreign Application Priority Data

Jun. 30, 1986 [JP] Japan ............................ 61-153739

[51] Int. Cl.$^4$ ............................................. G05B 5/01
[52] U.S. Cl. .............................. 318/568.22; 318/632; 318/567; 318/568.16; 901/9; 901/15; 364/513
[58] Field of Search .................... 318/632, 562–574; 901/2, 9, 14, 15, 16, 17, 18, 19, 21, 23, 24; 364/513

[56] References Cited

U.S. PATENT DOCUMENTS

| 4,156,835 | 5/1979  | Whitney et al. ................. 318/561 |
| 4,266,905 | 5/1981  | Birk et al. ........................ 901/40 |
| 4,278,920 | 7/1981  | Ruoff, Jr. ........................ 901/15 |
| 4,547,858 | 10/1985 | Horak ............................. 901/9 X |
| 4,620,831 | 11/1986 | Poncet et al. ................... 364/513 |
| 4,774,445 | 9/1988  | Penkar ........................... 318/568 |
| 4,788,482 | 11/1988 | Tachibana et al. ............... 901/9 |
| 4,792,715 | 12/1988 | Barskey et al. .................. 901/9 X |

Primary Examiner—William M. Shoop, Jr.
Assistant Examiner—Paul Ip
Attorney, Agent, or Firm—Staas & Halsey

[57] ABSTRACT

In a robot control apparatus, the results of processing regarding inertia terms of a motion equation are stored in accordance with the position of a robot arm. The computation period of the inertia terms can be set to be larger than a drive torque computation period. The robot is controlled with the same precision and, moreover, drive torque can be computed at a shorter computation time.

7 Claims, 3 Drawing Sheets

ROBOT CONTROL APPARATUS

BACKGROUND OF THE INVENTION

This invention relates to a robot control apparatus for servo-controlling various drive means by calculating, on-line, the torque command of a robot arm on the basis of the motion equation of a manipulator.

Horizontal articulated-type robots of the kind shown in FIG. 4 have recently come into use on factory assembly lines and the like. A robot of this type comprises a post 1, a first arm 2, a second arm 3, a hand 4, a joint shaft 5, a cable 6, a base 11 and covers 22, 32. When the arms and the hand are driven by servomotors (not shown) to grip a workpiece and perform other motions, a torque command for the robot arms is calculated on-line by a microcomputer for servo-control based on a manipulator motion equation, whereby each of the drive means is servo-controlled.

The drive torque of a servomotor used for robot arm drive is determined as a function of the weight of the workpiece gripped by the hand and inertia determined by the length of the arm. However, the torque necessary for motion when the workpiece is being gripped differs from that when the workpiece is not being gripped. Accordingly, the operator provides a control unit with inputs indicative of whether the robot arm is gripping a workpiece, the weight of the workpiece, etc., and the control unit calculates inertia by computing complicated simultaneous equations, thereby commanding a drive torque of the servomotor. Consequently, the operation for commanding the drive torque of the servomotor is troublesome and the processing performed by the control unit is complicated. In order to compute other parameters such as control current during execution of this processing, a considerable high-speed processing capability is required.

SUMMARY OF THE INVENTION

The present invention has been devised to solve the foregoing problems and its object is to provide an inexpensive robot control apparatus capable of shortening the processing time required for torque calculation and of executing highly precise control without interfering with other processing for current control and the like.

The robot control apparatus of the present invention is constituted as follows: Specifically the invention is characterized by having a servomotor for driving a manipulator through the intermediary of a robot arm, arithmetic means for computing drive torque of the servomotor in accordance with a motion equation, memory means for executing a computation, with regard to an inertia term included in the motion equation, at a predetermined period greater than a drive torque computation period in dependence upon the position of the robot arm, and for sequentially updating and storing the results of this computation, and control means for performing feed-forward compensation of the servomotor based on the motion equation.

DESCRIPTION OF THE PREFERRED EMBODIMENT

Figure 1:
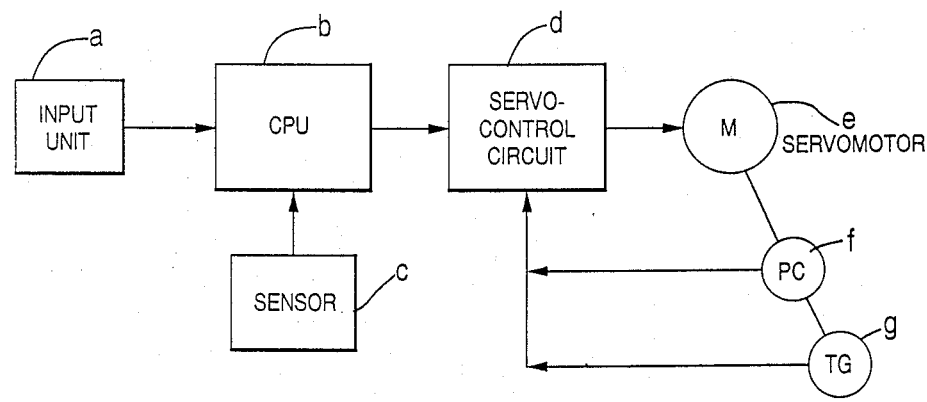
FIG. 1 is a block diagram of an embodiment of the present invention.

An embodiment of the invention will now be described in detail with reference to the drawings. FIG. 1 is a schematic block diagram of the invention, in which a represents an input unit, b a CPU (central processing unit), and c a sensor provided on a robot hand for sensing that the robot hand has gripped a workpiece. For example, a weight sensor provided between the robot hand and wrist can be used as the sensor.

Further, d denotes a servocontrol circuit, e a servomotor for drive along each axis of the robot, f a pulse coder for detecting the rotational angle of the servomotor, and g a tachogenerator for detecting the rotational speed of the servomotor.

Figure 2:
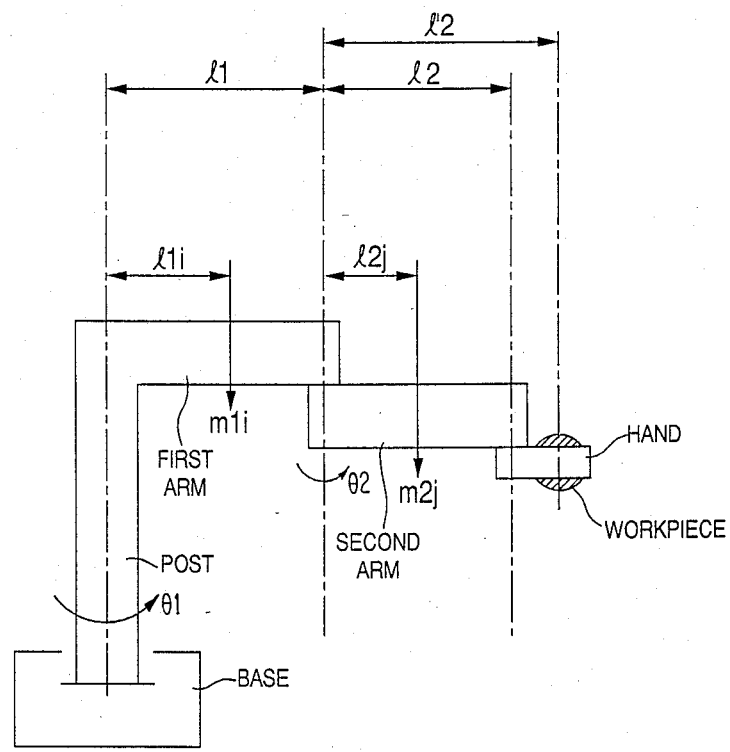
FIG. 2 is a schematic diagram of a horizontal articulated-type robot.
Figure 4:
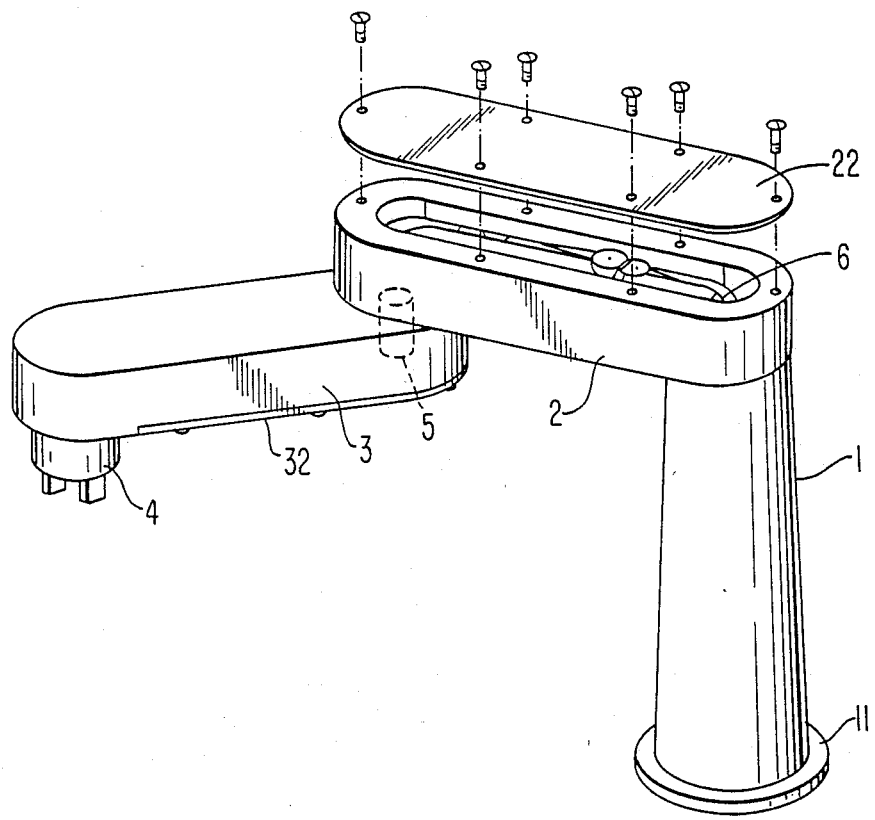
FIG. 4 is a partially exploded perspective view of a horizontal articulated-type robot.

A method of commanding torque for the servomotor e by means of the robot control apparatus of the invention will now be described. The horizontal articulated-type robot shown in FIG. 4 can be expressed by a simplified diagram, as shown in FIG. 2. In the diagram, we have the following:

$l_1$: length of first arm $l_2$: length of second arm $l_2'$: length from rotational axis $\theta_2$ to hand (where we let $l_2 = l_2'$ for simplicity)

$m_1i$, $m_2j$: i-th and j-th weights obtained by dividing the weights of the arms of the respective axes by k, n, respectively $l_1i$, $l_2j$: lengths from the rotational centers of the axes to weight dividing points Considering the weight of a workpiece as being the weight $m_2n$ of an n-th material point of the second arm, drive torque $T_1$ of a first axis $\theta_1$ is expressed by the following motion equation:

$$\begin{aligned} T_1 &= [\Sigma\, m_1i l_1i^2 + \Sigma\, m_2j\, \{l_1^2 + l_2j^2 + \\ &\quad 2l_1 l_2j \cos\theta_2\}]\ddot{\theta}_1 + [\Sigma\, m_2j\, (l_2j^2 + \\ &\quad l_1 l_2j \cos\theta_2)]\ddot{\theta}_2 - [\Sigma\, m_2j(2l_1 l_2n \sin\theta_2)]\dot{\theta}_1\dot{\theta}_2 - \\ &\quad [\Sigma\, m_2j(l_1 l_2n \sin\theta_2)]\dot{\theta}_2^2 \\ &= A\ddot{\theta}_1 + B\ddot{\theta}_2 - C\dot{\theta}_1\dot{\theta}_2 - D\dot{\theta}_2^2 \end{aligned}$$

The coefficients A, B, C and D of each of the non-linear terms represent the inertia corresponding to workpiece weight and arm position.

When a horizontal articulated-type robot of this kind is used on a factory assembly line or the like, the operator inputs the weights $m_2n$ of various workpieces to the CPU b in advance by means of the input unit a. On the basis of the weight of each workpiece, the CPU b determines the coefficients A, B, C and D of the non-linear terms, which are dependent solely upon the position of the manipulator, in the above-mentioned torque computation equation, and stores these coefficients as inertia terms corresponding to workpiece weight and arm position.

Next, when the robot is operated to grip a workpiece, the sensor c sends a signal, which is indicative of the fact that the workpiece has been gripped, to the CPU b. In accordance with this signal sent by the sensor c and a signal indicative of manipulator position obtained from the pulse coder f, the CPU b reads out the corresponding inertia term and sends a control signal, which applies drive torque compensation to the servomotor e by feed-forward, to the servo-control circuit d.

In the robot operation for gripping a workpiece, the robot control apparatus checks the control program of the robot and on the basis of this is capable of discriminating the type of workpiece about to be gripped or the type of workpiece being gripped.

Figure 3:
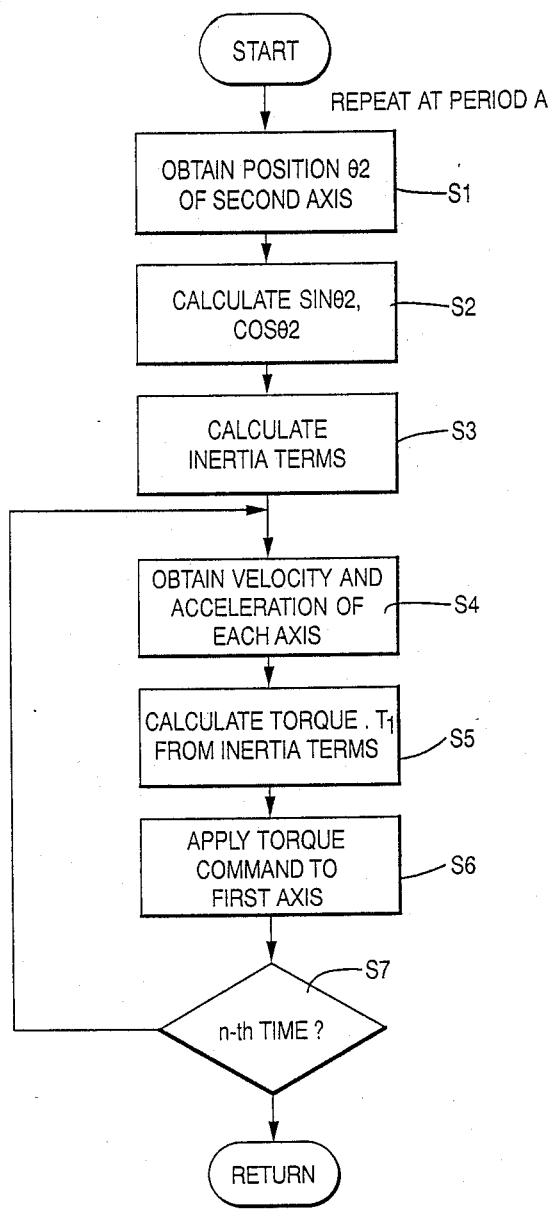
FIG. 3 is a flowchart illustrating an example of operation.

FIG. 3 is a flowchart illustrating an example of a processing operation performed by the above-described robot control apparatus.

In order to apply a torque command to the first axis, $T_1$ must be computed from the torque computation equation. However, in an ordinary robot motion equation, the rate of change in arm position may be assumed to be smaller than the rate of change in velocity or acceleration. Therefore, the position of the second axis, namely the rotational angle $\theta_2$, is obtained (step S1). On the basis of this angle, the corresponding sine and cosine values are calculated from a function table or the like (step S2). The inertia terms corresponding to the weight of the workpiece are then calculated (step S3). Next, the velocity and acceleration $\dot{\theta}_1$, $\ddot{\theta}_1$ along the firxt axis and the velocity and acceleration, $\dot{\theta}_2$, $\ddot{\theta}_2$ along the second axis are obtained (step S4). The torque $T_1$ is calculated from the inertia values calculated and stored at step S3 (Step S5). The torque command is applied to the first axis (step S6). This calculation cycle (steps S4-S6) is repeated n times (step S7), during which identical inertia values are taken as a reference. The program subsequently returns to step S1. Letting B represent the calculation time at step (S5), the flow of FIG. 3 will be repeated at a period A ($>$nB).

It should be noted that it is unnecessary to fix the inertia term computation period A to n times the torque calculation period B, as is done in the above-described embodiment. For example, it will suffice to set the inertia term computation period to a large value with respect to the drive torque computation period, in accordance with the motion of the robot hand. The present invention is not limited to the foregoing embodiment and can be modified in various ways within the gist of the invention without departing from the scope of the claims thereof.

Thus, in accordance with the invention as described above, a rate of change in position is smaller than a rate of change in velocity or acceleration when torque is calculated using a robot motion equation. The inertia term calculation period A therefore can be set to be longer than the torque calculation period B, and the time required for torque calculation can be shortened. As a result, a highly precise torque command can be formed without interfering with other processing such as for current control. The invention is convenient in that processing for torque control and current control can be performed simultaneously.

Though the present invention relates to a horizontal articulated-type robot, the invention can also be applied to industrial robots of polar coordinate-type as well as other forms of industrial robots.

What is claimed is:

1. A robot control apparatus for computing, on-line, a torque command of a robot arm based on a motion equation of a manipulator, and for servo-controlling each drive means, comprising:
   a servomotor, coupled to the manipulator, for driving the manipulator through the intermediary of the robot arm;
   arithmetic means for computing drive torque of the servomotor in accordance with the motion equation;
   memory means for executing a computation, with regard to an inertia term included in the motion equation, at a predetermined period greater than a drive torque computation period in dependence upon the position of the robot arm, and for sequentially updating and storing the results of this computation; and
   control means for applying the drive torque to the servomotor and performing feed-forward compensation of the servomotor based on the motion equation.

2. A robot control apparatus according to claim 1, wherein the computation period of the inertia term performed by said arithmetic means is controlled to be a fixed period longer than the drive torque computation period.

3. A robot control apparatus according to claim 1, wherein the computation period of the inertia term performed by said arithmetic means is controlled to be a variable period dependent upon the operating velocity of the robot arm.

4. A robot control apparatus according to claim 1, further comprising means for sensing that the manipulator has gripped a work piece and for providing a sensing signal to said memory means.

5. A robot control apparatus for a robot having a robot arm with a robot hand attached to the robot arm, comprising:
   a servomotor for driving the robot hand and the robot arm;
   inputting means for inputting workpiece signals for identifying a plurality of workpieces;
   sensing means for providing a sensing signal corresponding to a workpiece held by the robot hand;
   processing means, coupled to said input means and said sensing means, for determining an inertia term included in a motion equation based on the workpiece signals and the sensing signal, said processing means computing drive torque of the servomotor in accordance with the motion equation, the inertia term being computed at a predetermined period greater than a period for computing the drive torque; and
   control means, coupled to said processing means and said servomotor, for performing feed-forward compensation of the servomotor based on the motion equation.

6. A method for controlling a robot having a robot arm with a robot hand attached to the robot arm, comprising the steps of:
   (a) inputting workpiece signals for identifying a plurality of workpieces;
   (b) generating a sensing signal corresponding to a workpiece held by the robot hand;
   (c) determining an inertia term included in a motion equation based on the weight of each workpiece and the sensing signal;
   (d) computing drive torque of a servomotor for driving the robot hand and the robot arm, in accordance with the motion equation, the inertia term being computed at a predetermined period greater than a period for computing the drive torque; and
   (e) performing feed-forward compensation of the servomotor based on the motion equation to cause the servomotor to drive the robot hand and the robot arm.

7. A robot control apparatus for a robot having a robot arm with a robot hand attached to the robot arm, comprising:

an input unit for inputting weights of various workpieces;

memory means, for receiving the weights of the workpieces from said input unit, calculating drive torque and coefficients of non-linear terms on the basis of the weight of each workpiece, and storing the coefficients as inertia terms corresponding to the workpiece weight and robot arm position, the period for calculating said inertia terms being larger than a period for calculating said drive torque;

a sensor, coupled to said memory means, for inputting a signal to said memory means indicating that a workpiece has been gripped;

servo-control means for receiving control signals corresponding to said inertia terms from said memory means;

a servomotor, coupled to said servo-control means, for receiving said drive torque and providing drive along each axis of the robot; and arithmetic means for detecting a rotational angle of said servomotor and for detecting a rotational speed of said servomotor, the rotational angle and the rotational speed of said servomotor being input to said servo-control means for providing drive torque compensation to said servomotor.

* * * * *